(12) United States Patent
West

(10) Patent No.: US 12,304,398 B2
(45) Date of Patent: May 20, 2025

(54) APPARATUS AND METHOD FOR ELIMINATING HOOD NOISES IN TRACTOR TRAILER TRUCKS

(71) Applicant: Joel Justin West, Cheyenne, WY (US)

(72) Inventor: Joel Justin West, Cheyenne, WY (US)

(*) Notice: Subject to any disclaimer, the term of this patent is extended or adjusted under 35 U.S.C. 154(b) by 0 days.

(21) Appl. No.: 18/527,012

(22) Filed: Dec. 1, 2023

(65) Prior Publication Data

US 2024/0092284 A1 Mar. 21, 2024

Related U.S. Application Data

(63) Continuation of application No. 17/301,394, filed on Apr. 1, 2021, now Pat. No. 11,865,980.

(60) Provisional application No. 63/032,174, filed on May 29, 2020.

(51) Int. Cl.
B60R 13/08 (2006.01)

(52) U.S. Cl.
CPC ...... B60R 13/0838 (2013.01); B60R 13/0884 (2013.01)

(58) Field of Classification Search
CPC . B60R 13/00; B60R 13/0838; B60R 13/0884; B60R 13/08; B60R 13/083; B60R 13/0815; B62D 25/12; B62D 25/10; B62D 25/081; B62D 25/105; B62D 25/082; B62D 25/163; B62D 25/165
See application file for complete search history.

(56) References Cited

U.S. PATENT DOCUMENTS

| | | | | |
|---|---|---|---|---|
| 5,890,556 A * | 4/1999 | Shearn | ............ | B62D 25/12 180/69.21 |
| 6,394,211 B1 * | 5/2002 | Palenchar | ............ | E05B 79/20 180/69.21 |
| 6,640,918 B2 * | 11/2003 | Sorvari | ............ | B62D 25/10 180/69.22 |
| 6,796,393 B2 * | 9/2004 | Sutton | ............ | B62D 25/12 180/69.2 |
| 7,690,722 B2 * | 4/2010 | Boggess | ............ | B60R 21/34 296/187.04 |
| 8,888,170 B2 * | 11/2014 | McCuller | ............ | E05F 5/022 296/193.11 |
| 9,290,979 B1 * | 3/2016 | Alexander | ............ | E05F 5/022 |
| 9,745,000 B2 * | 8/2017 | Barreiro | ............ | B60Q 1/0483 |
| 10,464,503 B2 * | 11/2019 | Zhou | ............ | B62D 25/105 |
| 10,821,933 B2 * | 11/2020 | Hammer | ............ | B60R 13/0838 |
| 12,077,126 B2 * | 9/2024 | Kim | ............ | B62D 25/12 |

(Continued)

*Primary Examiner* — James M Dolak
(74) *Attorney, Agent, or Firm* — Squire Patent Consulting & IP Law LLC; Brendan E. Squire

(57) ABSTRACT

A method and apparatus for noise reduction in a semi-truck tractor. The semi-truck tractor has hood cowling that is carried on an upper hood support mounted to a firewall of the semi-truck tractor. The invention includes applying a resilient sleeve to the upper hood support to eliminate a noise generated by vibration of the hood cowling when supported by the upper hood support. The resilient sleeve has an opening at a proximal end of the sleeve. The sleeve is dimensioned to surround an exposed face of the upper hood support when mounted to the firewall. The resilient sleeve provides a low friction barrier between the hood cowling and the upper hood support with the hood cowling in a closed position and supported by the upper hood support.

20 Claims, 3 Drawing Sheets

(56) References Cited

U.S. PATENT DOCUMENTS 12,123,227 B2 * 10/2024 Miyake .................... B60J 5/107
2006/0064845 A1 * 3/2006 Fujii ....................... E05F 5/022
16/82

* cited by examiner

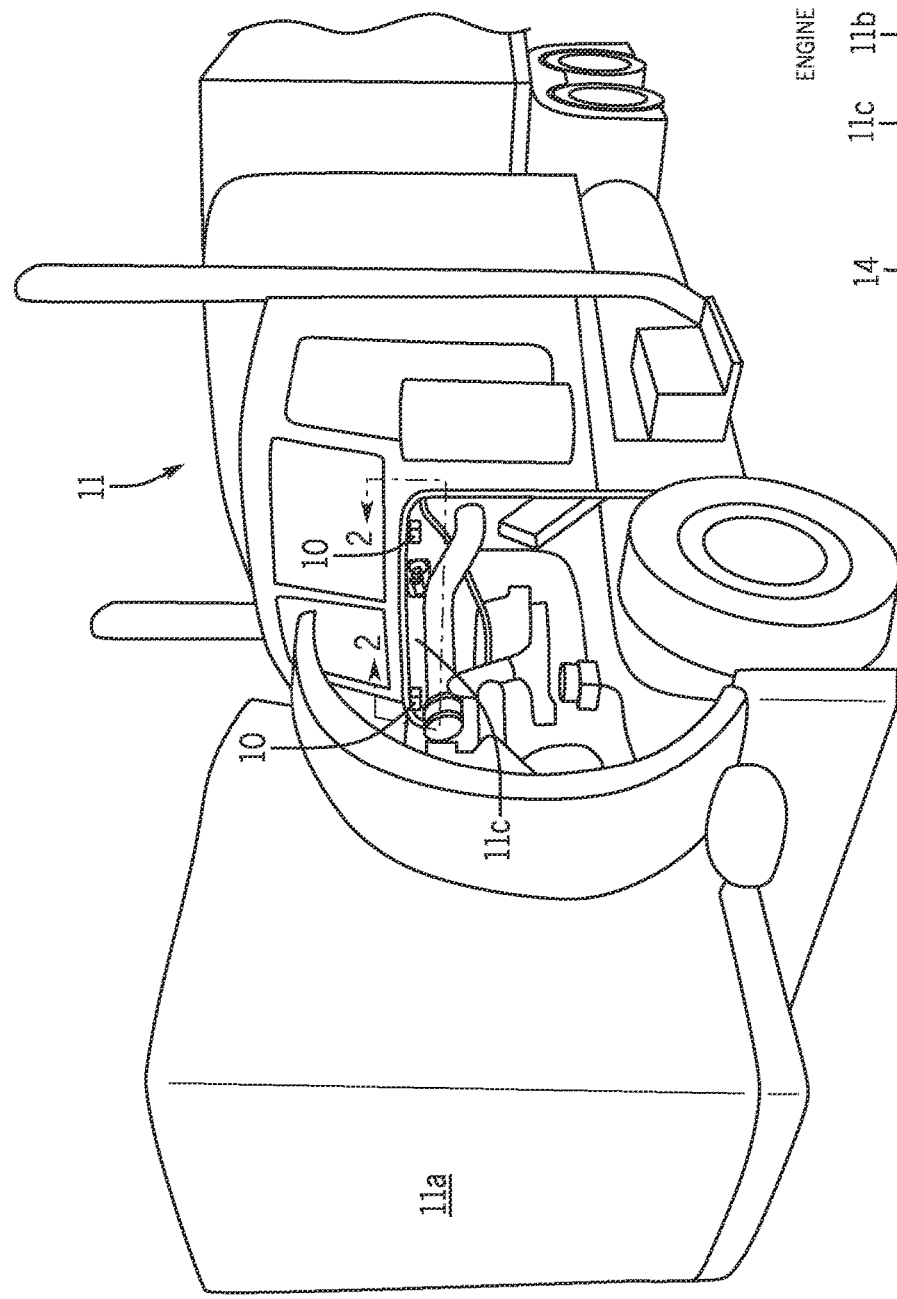
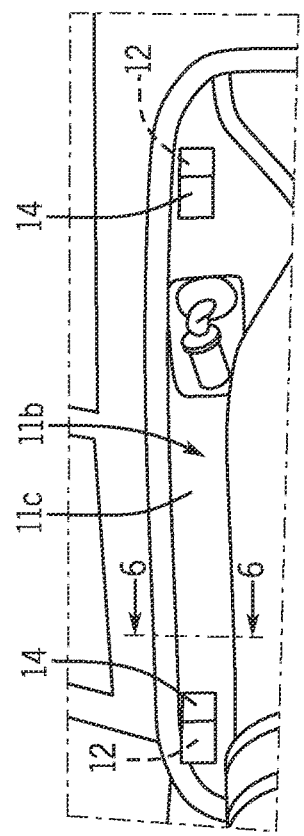
FIG. 1
FIG. 2

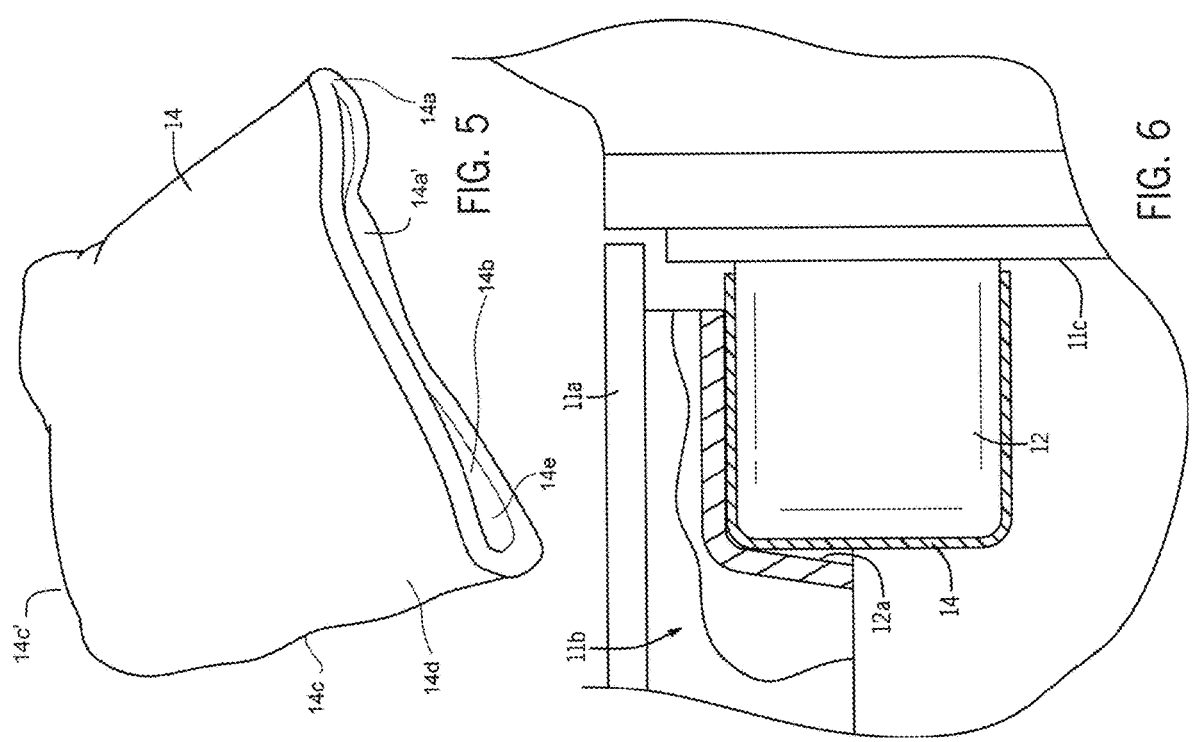

APPARATUS AND METHOD FOR ELIMINATING HOOD NOISES IN TRACTOR TRAILER TRUCKS

CROSS-REFERENCE TO RELATED APPLICATION

This application is a continuation of U.S. patent application Ser. No. 17/301,394, filed Apr. 13, 2021, and claims the benefit of priority of U.S. provisional application No. 63/032,174 filed May 29, 2020, the contents of which are herein incorporated by reference.

BACKGROUND OF THE INVENTION

The present invention relates to semi-truck tractor, and more particularly to noise reduction apparatus for the same.

For semi-truck tractors, the incidence of noise, and the reduction thereof, are of concern for the tractor operator. Persistent nuisance noises, posing no threat to the operation of the truck can mask or distract from the emergence of other noises that may signal a degradation of the operating systems of the tractor so that it may be operated safely. Likewise, the presence of nuisance noises can add to operator fatigue and otherwise distract from safe operation of the truck.

In some semi-truck tractors, the hood cowling can experience vibration noises and squeaking due to road induced vibrations in the hood. Even with the hood latches properly adjusted and securing the hood cowling, these noises persist.

As can be seen, there is a need for apparatus and methods for eliminating vibration noises from hood cowlings in semi-tractor trucks.

SUMMARY OF THE INVENTION

In one aspect of the present invention, a noise reduction apparatus for a semi-truck tractor is disclosed. The semi-truck tractor has a hood cowling for selectively accessing and closing over an engine compartment of the semi-truck tractor. An upper hood support is mounted to a firewall of the semi-truck tractor. The hood cowling is supported by an upper hood support when the hood cowling is moved to a closed position over the engine compartment. The noise reduction apparatus includes a resilient sleeve having an opening at a proximal end of the sleeve. The sleeve is dimensioned to surround an exposed face of the upper hood support when mounted to the firewall. The resilient sleeve providing a low friction barrier between the hood cowling and the upper hood support with the hood cowling in a closed position and supported by the upper hood support.

In some embodiments, a first stitch surrounds the opening of the resilient sleeve. The first stitch may be an elastic stitch.

In some embodiments, a second stitch extends along a lateral aspect of the sleeve. The second stitch may provide a closure of the resilient sleeve at a distal end of the sleeve.

In some embodiments, the resilient sleeve is formed of a low friction fabric material.

In other aspects of the invention, a method of noise reduction for a semi-truck tractor is disclosed. The semi-truck tractor has a hood cowling for selectively accessing and closing over an engine compartment of the semi-truck tractor. An upper hood support is mounted to a firewall of the semi-truck tractor. The hood cowling is supported by an upper hood support when the hood cowling is moved to a closed position over the engine compartment. The method includes opening the hood cowling. A resilient sleeve is then applied to the upper hood support. The sleeve has an opening at a proximal end of the sleeve. The resilient sleeve is dimensioned to surround an exposed face of the upper hood support when mounted to the firewall. The resilient sleeve provides a low friction barrier between the hood cowling and the upper hood support with the hood cowling in a closed position and supported by the upper hood support.

In some embodiments the method includes closing the hood cowling so that the resilient sleeve is interposed between an inner surface of the hood cowling and a top surface of the upper hood support.

In some embodiments, a first stitch is applied surrounding the opening of the resilient sleeve. The first stitch may be an elastic stitch.

These and other features, aspects and advantages of the present invention will become better understood with reference to the following drawings, description and claims.

BRIEF DESCRIPTION OF THE DRAWINGS

FIG. 1 is a front perspective view of a truck hood hinged in an open position.

FIG. 2 is a detail elevation view indicated by the line 2-2 of FIG. 1.

FIG. 5 is a perspective view of the sleeve of the invention.

FIG. 6 is a cross-sectional view taken on line 6-6 of FIG. 2.

DETAILED DESCRIPTION

Figure 3:
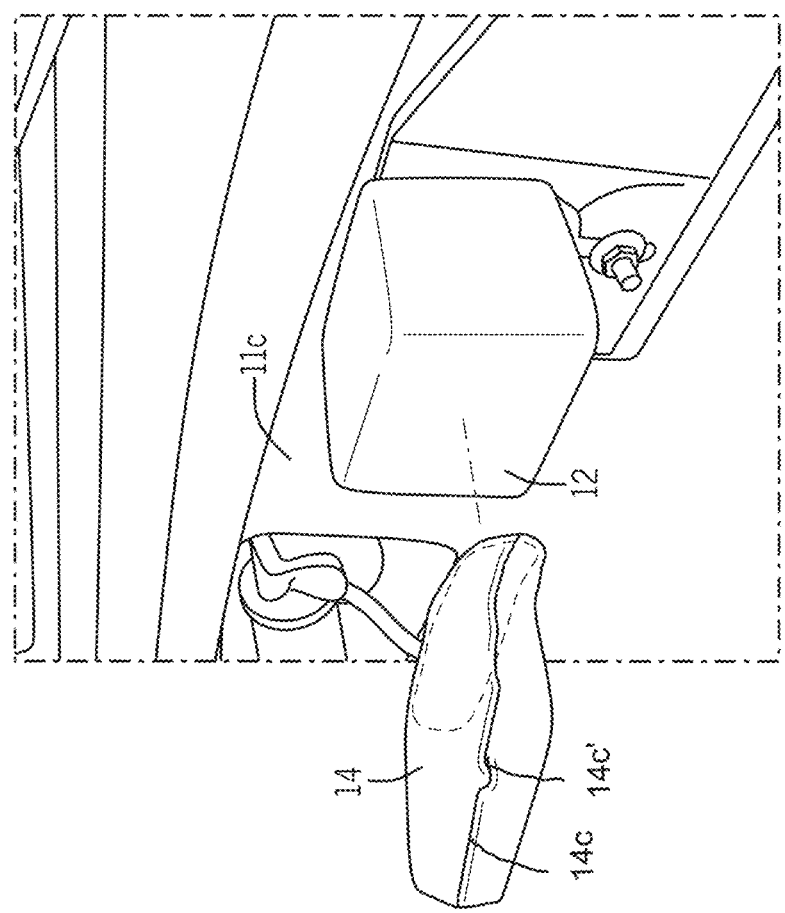
FIG. 3 is a detail perspective view of the invention in use.
Figure 4:
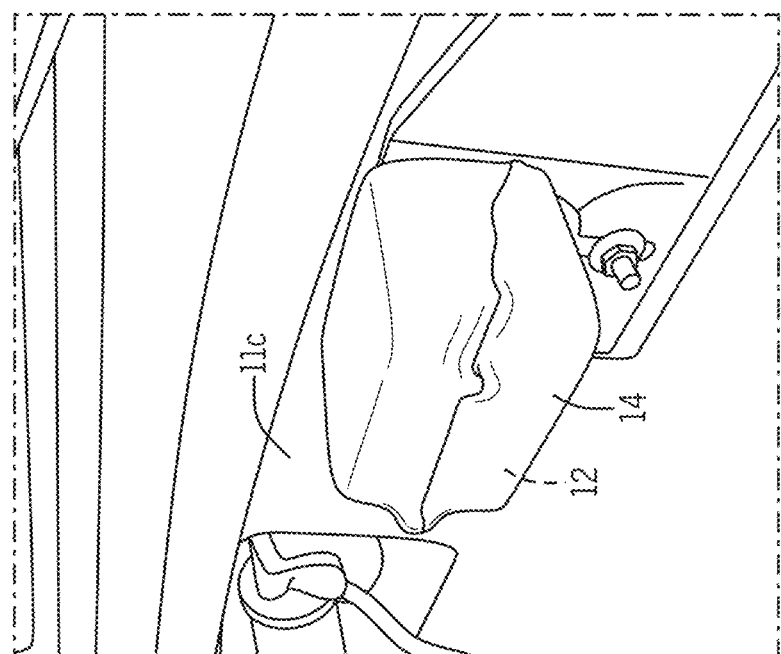
FIG. 4 is a detail exploded view of the invention in use.

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide apparatus and methods for eliminating vibration noises from hood cowlings in semi-tractor trucks.

A representative semi-truck tractor 11 is shown in reference to FIG. 1. The tractor 11 includes a hood cowling 11a that is pivotally coupled to the tractor 11 to provide access to the engine compartment 11b of the tractor 11. A firewall 11c extends across an aft end of the engine compartment 11b.

A plurality of upper hood supports 12 are mounted to the firewall 11c. The upper hood supports 12 provide a rest upon which an aft end of the hood cowling 11a is supported, when the hood cowling 11a is in a closed position. As best seen in reference to FIG. 6, a hood support recess 12a is defined at the aft end of the hood cowling 11 and are configured to proper align the hood cowling 11a with the tractor 11 as the hood cowling 11a is moved to the closed position. The upper hood supports 12 are formed of a rubberized resilient material.

In the closed position, vibrational movements of the hood cowling 11a against the upper hood supports 12 lead to undesirable and distracting squeaking noises as the tractor 11 is driven along a roadway.

The present invention is directed to eliminating this undesirable squeaking noise. The present invention includes a resilient sleeve 14 dimensioned to cover the body of the upper hood support 12. The resilient sleeve 14 is configured to be applied to the upper hood support 12 so that it surrounds the side faces of the hood support 12 when the upper hood support 12 is installed on the firewall 11*c* of the tractor 11.

The resilient sleeve 14 a low friction fabric barrier between the upper hood support 12 and hood support recess 12*a*, such as those on extended hood Peterbilt trucks. The resilient sleeve 14 prevents the metal of the hood and rubber of the upper hood support 12 from rubbing together and making a high pitch squeaking noise, that is loudly audible in the cab of the tractor 11. The resilient sleeve 14 is formed of a double layer of a resilient fabric material, preferably nylon spandex material.

The resilient fabric sleeve 14 includes a band 14*a* formed of a plurality of layers of a low-friction fabric material such that the plurality of layers slide relative to each other when impinged between the hood cowling 11*a* and the hood support 12. The resilient fabric sleeve 14 surrounds an opening 14*b* at a proximal end of the resilient fabric sleeve 14. The band 14*a* and the opening 14*b* are dimensioned to surround the upper hood support 12, when installed in the firewall 11*c* of the tractor 11. The band 14*a* provides a snug retaining fit of the resilient fabric sleeve 14 about the hood support 12 at its junction with the firewall 11*c*. The band 14*a* may be formed by a first stitch 14*a*'. Preferably, the first stitch 14*a*' is an elastic stitch. A seam 14*c* may extend around a lateral aspect of the resilient fabric sleeve 14. The seam 14*c* provides a closure of a second opening 14*c*' at a distal end of the resilient fabric sleeve 14, may be closed by a second stitch 14*c*. The plurality of layers of the resilient fabric sleeve 14 may include an outer layer 14*d* and an inner layer 14*e* that are preferably formed of a low-friction fabric material such as a nylon spandex material.

It should be understood, of course, that the foregoing relates to exemplary embodiments of the invention and that modifications may be made without departing from the spirit and scope of the invention as set forth in the following claims.

What is claimed is:

1. A noise reduction apparatus for a semi-truck tractor, the semi-truck tractor having a hood cowling for selectively accessing and closing over an engine compartment of the semi-truck tractor, an upper hood support mounted within the engine compartment of the semi-truck tractor, the hood cowling supported by the upper hood support when the hood cowling is moved to a closed position over the engine compartment, the noise reduction apparatus comprising:
    a resilient fabric sleeve having a first opening at a proximal end of the resilient fabric sleeve, the resilient fabric sleeve dimensioned to surround an exposed face of the upper hood support, the resilient fabric sleeve providing a low friction barrier between the hood cowling and the upper hood support with the hood cowling in the closed position and supported by the upper hood support.

2. The noise reduction apparatus of claim 1, further comprising:
    a band surrounding the opening at the proximal end of the resilient fabric sleeve.

3. The noise reduction apparatus of claim 2, wherein the band comprises an elastic stitch.

4. The noise reduction apparatus of claim 1, further comprising:
    a second opening at a distal end of the resilient fabric sleeve.

5. The noise reduction apparatus of claim 4, further comprising:
    a seam extends along the second opening of the resilient fabric sleeve.

6. The noise reduction apparatus of claim 5, wherein the seam provides a closure of the resilient fabric sleeve at a distal end of the resilient sleeve.

7. The noise reduction apparatus of claim 1, wherein the resilient fabric sleeve is formed of a low-friction fabric material.

8. The noise reduction apparatus of claim 1, wherein the resilient fabric sleeve is formed of a double layer of a resilient fabric material.

9. The noise reduction apparatus of claim 8, wherein the resilient fabric material is a nylon spandex material.

10. A noise reduction apparatus for a semi-truck tractor, the semi-truck tractor having a hood cowling for selectively accessing and closing over an engine compartment of the semi-truck tractor, an upper hood support mounted within the engine compartment of the semi-truck tractor, the hood cowling supported by the upper hood support when the hood cowling is moved to a closed position over the engine compartment, the noise reduction apparatus comprising:
    a low-friction resilient fabric material configured to be removably coupled with the upper hood support and dimensioned to surround an exposed face of the upper hood support, the low-friction resilient fabric material providing a low-friction barrier between the hood cowling and a hood supporting surface of the upper hood support with the hood cowling in the closed position.

11. The noise reduction apparatus of claim 10, further comprising:
    a sleeve formed of the low-friction resilient fabric material; and
    an opening at a proximal end of the sleeve.

12. The noise reduction apparatus of claim 11, further comprising:
    a first elastic stitch surrounding the opening of the sleeve.

13. The noise reduction apparatus of claim 12, further comprising:
    a second opening at a distal end of the sleeve.

14. The noise reduction apparatus of claim 13, further comprising:
    a second stitch extends along the second opening of the sleeve.

15. The noise reduction apparatus of claim 14, wherein the second stitch provides a closure of the second opening.

16. The noise reduction apparatus of claim 15, wherein where the sleeve is interposed between the upper hood support and the hood cowling, the sleeve is formed of a double layer of the low-friction resilient fabric material.

17. The noise reduction apparatus of claim 10, wherein the low friction resilient fabric material is a nylon spandex material.

18. A method of noise reduction for a semi-truck tractor, the semi-truck tractor having a hood cowling for selectively accessing and closing over an engine compartment of the semi-truck tractor, an upper hood support mounted within the engine compartment and disposed to support the hood cowling when the hood cowling is moved to a closed position over the engine compartment, the method comprising:
    forming a resilient fabric sleeve having a proximal end and a distal end, the resilient fabric sleeve having an opening at the proximal end dimensioned to surround the upper hood support, the resilient fabric sleeve having a sidewall dimensioned to elastically retain the resilient fabric sleeve around the upper hood support; and applying the resilient fabric sleeve to the upper hood support, such that the sidewall is interposed between the upper hood support and the hood cowling providing a low friction barrier between the hood cowling and the upper hood support with the hood cowling in the closed position and supported by the upper hood support.

19. The method of claim 18, further comprising:

closing the hood cowling so that the resilient sleeve is interposed between the hood cowling and a top surface of the upper hood support.

20. The method of claim 19, further comprising:

applying an elastic stitch surrounding the opening of the resilient fabric sleeve.

\* \* \* \* \*